UNITED STATES PATENT OFFICE.

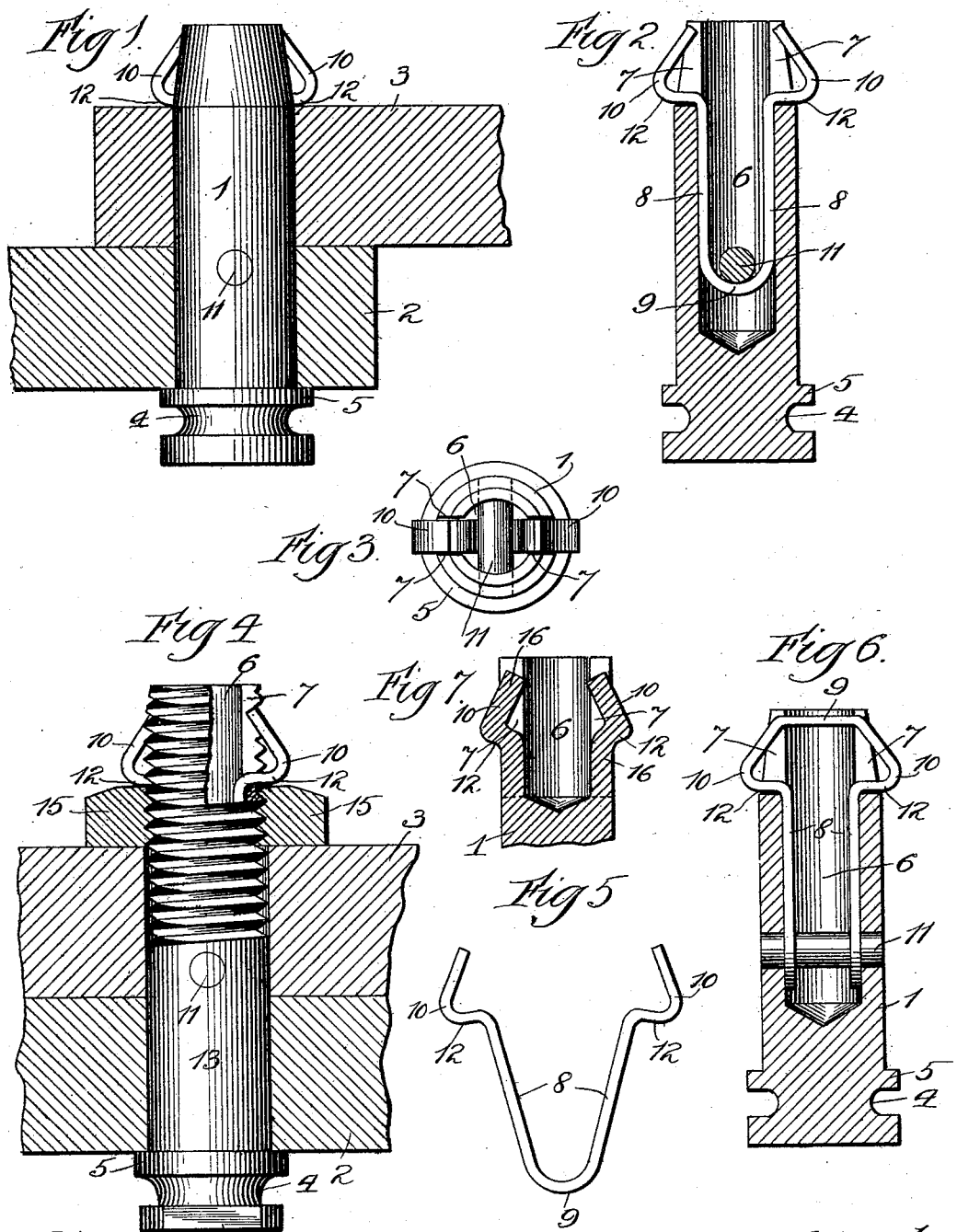

FRANK B. BRADLEY, OF CHICAGO, ILLINOIS, ASSIGNOR TO THE AJAX FORGE COMPANY, OF SAME PLACE.

NUT OR BOLT LOCK.

SPECIFICATION forming part of Letters Patent No. 530,083, dated December 4, 1894.

Application filed March 26, 1894. Serial No. 505,106. (No model.)

*To all whom it may concern:*

Be it known that I, FRANK B. BRADLEY, a citizen of the United States, and a resident of Chicago, in the county of Cook and State of Illinois, have invented certain new and useful Improvements in Bolt or Nut Locks, of which the following is a full, clear, and exact description, reference being had to the accompanying drawings, forming a part of this specification.

My invention relates to appliances for retaining bolts, pins, studs, pivots and all similar and analogous devices in required relation to any part or parts which are secured in connection with each other or with different structural parts by the bolts, pins or other devices. For example, my invention relates to appliances for retaining a bolt in connection with a nut; a pin in connection with two bars coupled together by such p ; an arm upon a frame-piece; or a lever in connection with a link, or upon its pivot; the variety of purposes to which my invention can be applied being exceedingly great or wide as will be obvious from the ensuing description.

Among the primary objects of my invention is included that of producing a lock for bolts, pins, pivots and the like, which shall be simple, strong, durable and inexpensive in construction, capable of application to a great variety of uses and which, while retaining the bolt and other mentioned parts securely in position, so long as such retention is desired, shall permit a ready and easy voluntary disconnection of the bolt or other device when desired.

A further primary object of my invention is to produce a lock which shall be effectively inclosed or protected so as to be free from all liability of destruction or injury by forcible contact with external objects, or with adjacent structural parts.

The above-mentioned objects, and also with such others as may appear from the ensuing description, are attained by virtue of the construction shown in the accompanying drawings, in which—

Figure 1 is a side elevation of a connecting-pin or stud and a sectional view of two structural parts connected by said pin; said pin having a locking-attachment embodying my invention applied thereto. Fig. 2 is a central longitudinal section of the pin and its locking-attachment detached from any connected structural parts. Fig. 3 is an end elevation of the same, viewed toward the exposed part of the locking-device. Fig. 4 is a view similar to that of Fig. 1, but showing a screw-bolt and a nut provided with a lock embodying my invention and in position relative to two connected structural parts. Fig. 5 is a detached view, in side elevation, of a locking-device embodying my invention. Fig. 6 is a view similar to Fig. 2 but showing a modified form of locking-attachment embodying my invention, and Fig. 7 is a modification, illustrating the principles of my invention.

Referring first to Figs. 1, 2 and 3, 1 designates a connecting-pin or stud and 2 and 3 two structural parts which are to be assumed as connected together by said pin or stud. For example, let the parts 2 and 3 be considered as adjacent fragments of the bars which connect the switch-rails of a railway-track with a switch-stand. The pin 1 is of any suitable or desirable general form and size, according to the particular use to which it is to be devoted in any given instance, but its body-portion is smooth or plain externally as distinguished from a bolt. I have shown the bolt as formed at one end with an encircling groove 4 to be engaged by a claw-bar or a similar implement when it is desired to remove the pin or stud. I have also shown this end of the pin or stud as formed with an external shoulder 5 for limiting the insertion of the bolt or pin, but it is to be understood that these features are not essential to my invention, and are therefore susceptible of being altered or dispensed with as desired.

In accordance with my invention, I form in the pin 1 a longitudinal socket or cavity, such as at 6, which is closed at its inner end, and the outer end of which opens at that end of the pin or stud which is remote from the groove 4. The cavity or socket 6 is of any proper length or depth and also of any proper diameter or width (since the socket may be of any desirable contour transversely). Through the outer extremity of the socket-wall are formed two, or any desirable number, of longitudinal slits 7; two of such slits being shown and appearing as located precisely opposite each other.

Within the cavity or socket 6 is located a locking-device 8, which is formed of a piece of spring-tempered steel, or of any other suitably strong and at the same time resilient metal. A very desirable form of this locking-attachment is best shown in Fig. 5, in which the body-portion of the device is composed of two opposite arms united together by an integral bend 9 of approximately V-form, and each formed at its free end with an outward lateral bent portion or extension 10, also integral with the arms, and of approximately L-shape. The tendency of the resilience of the device is to cause the arms thereof to diverge into approximately V-form, but when the device is in position in the socket 6 the arms are compressed toward each other so as to be parallel with each other, or more nearly so than when the device is detached.

When the locking-attachment above described is in the socket 6, the bends and end-portions only of the extensions 10 are exposed beyond the pin or stud; such extensions protruding through the slits 7. This is a peculiarly advantageous feature of my invention, inasmuch as the almost complete inclosure or housing of the locking-device within the stud or pin renders any injury of the device almost impossible. A cross-pin or rivet 11 is shown as inserted through the walls of the socket 6 at such point as to engage the concave side of the bend 9 and to prevent any accidental displacement of the locking-device from its socket 6; it being the intention, however, to enable the cross-pin 11 to be forced or driven out of position voluntarily when it is desired for any sufficient reason to remove the locking-device from the stud or pin 1.

It will be readily seen that those surfaces of the extensions 10 which are remote from the free extremities of said extensions constitute external shoulders, as at 12, against which the proximate surface of an adjacent part will abut so as to be prevented normally from moving past said bends or shoulders 12 in a direction toward the free ends of the extensions. Inasmuch as the free parts of the extensions are inclined inwardly and toward the adjacent end of the bolt or pin, the spring locking-device, when the end of the pin or bolt is being inserted and moved through the parts 2 and 3, will be automatically compressed inward so as to offer no impediment to the insertion of said pin or bolt; the extensions automatically springing into exposed operative position as soon as the bolt or pin 1 has reached its ultimate proper position.

In Fig. 4 I have shown my invention as applied to a screw-bolt, and this application of the invention involves no material alteration of construction; similar parts being therefore designated by like numerals of reference. I have shown the head 14 of the bolt as angular to receive a wrench, and also as formed with the groove 4 to receive a claw-bar, but obviously this is not an essential to my invention. The shoulders 12 of the extensions 10, in this instance, abut against the outer surface of a suitable nut 15.

In Fig. 6 I have shown a modification of construction which simply involves the locating of the outward lateral extensions, adjacent to the connecting-bend 9 of the spring, and the placing of the free ends of the spring adjacent to the inner end of the socket or cavity 6; the free extremities of the spring in this instance loosely embracing the cross-pin 11, so that when the pin or bolt 1 is being inserted into place, the locking-spring shall be properly compressed.

Various other minor modifications of my invention may be adopted. The spring may have three, four or any desired number of arms, and but one arm may have a protruding extension such as 10; such single extension being then so modified in form as to afford the required extensiveness of external bearing. Obviously if the distance between the shoulder 5 and the bends 12 be greater than the thickness of the part or parts to be secured, one or more washers or equivalent devices may be employed to fill the vacant space (in cases where a perfectly close connection is necessary or preferable).

In Fig. 7, I have shown a still further structural modification embodying the essential principles of my invention. In this instance the pin or bolt 1 preferably, but not necessarily, has the longitudinal cavity 6, if preferred, but in any event any desired number of tongues 16 are formed directly from the substance of this end of the pin or bolt and each tongue is left integrally connected at one end to the body of the pin or bolt; the remainder of the tongue being left free. Intermediately of its ends, each tongue is bent to form the outwardly extending shoulder 10, the free extremity of the tongue lying normally in the space 7 left in the bolt or pin body by the formation of the tongue. The entire body of the tongue is rendered properly resilient, and it is obvious that one, two or as many of said tongues may be used with each pin or bolt as may be found desirable.

Having thus described my invention, what I claim as new therein, and desire to secure by Letters Patent, is—

1. The combination with a bolt, pin or similar device longitudinally socketed, of a locking attachment consisting of a resilient body-portion having a plurality of outwardly-pressing arms and shoulders, said attachment having its body inclosed within the socketed body of a bolt, or pin or similar device, so that its shoulders shall be external thereto, substantially as set forth.

2. A locking-attachment for bolts, pins, &c., consisting of a resilient body-portion having a plurality of outwardly pressing arms and provided with outwardly extending shoulders and also with inwardly inclined portions;

said attachment being designed for application to a bolt or pin, or similar device, so that the shoulders and inclines shall be external thereto, substantially as set forth.

3. The combination with a bolt, pin or similar device longitudinally socketed, of a locking attachment consisting of a resilient body-portion having a plurality of outwardly pressing arms and shoulders located at the free end-portions of said arms, said attachment having its body inclosed within the socketed body of a bolt, pin or similar device so that its shouldered portions shall be external thereto, substantially as set forth.

4. The combination with a bolt, pin, or similar device, of a locking attachment consisting of a bent resilient body-portion having a plurality of outwardly pressing arms and provided at the free end-portions with shoulders external to the pin or bolt and also with inwardly inclined portions terminating at a point within the exterior of said pin or bolt, substantially as set forth.

5. The combination with a pin, bolt, or similar device having a longitudinal socket opening at one of its ends, of a locking attachment consisting of a resilient body-portion inserted into said socket and having one or more shoulders and one or more inclines external to the socket and adapted to engage a nut upon the bolt, substantially as set forth.

6. The combination with a pin, bolt or similar device having a longitudinal socket opening at one of its ends and longitudinal slits at said open end, of a locking-device consisting of a resilient body-portion inserted into said socket and having one or more shoulders and one or more inclines working through said slits and constructed to engage a nut upon the bolt, substantially as set forth.

7. The combination with a pin, bolt or similar device having a longitudinal socket opening at one of its ends, of a locking-attachment consisting of a resilient body-portion inserted into said socket and having shoulders and inclines external thereto, adapted to engage a nut upon the bolt and a removable retaining-device for preventing displacement of the locking-device from the socket, substantially as set forth.

8. The combination with a bolt, pin or similar device longitudinally socketed, of a locking-attachment consisting of a resilient body-portion inclosed within said longitudinal socket in the body-portion of the bolt or pin and having an arm provided with a shoulder exposed from a bolt or pin, and an inclined portion terminating within the socket, substantially as set forth.

FRANK B. BRADLEY.

Witnesses:
W. R. OMOHUNDRO,
M. E. SHIELDS.